United States Patent
Ishikawa

(10) Patent No.: US 9,532,040 B2
(45) Date of Patent: Dec. 27, 2016

(54) VIRTUAL VIEWPOINT INTERVAL DETERMINATION SECTIONS APPARATUS AND METHOD

(71) Applicant: Sony Corporation, Tokyo (JP)

(72) Inventor: Keita Ishikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 252 days.

(21) Appl. No.: 14/281,996

(22) Filed: May 20, 2014

(65) Prior Publication Data

US 2014/0348418 A1    Nov. 27, 2014

(30) Foreign Application Priority Data

May 27, 2013  (JP) .................................. 2013-111031

(51) Int. Cl.
*H04N 13/00*  (2006.01)
*H04N 13/04*  (2006.01)

(52) U.S. Cl.
CPC ...... *H04N 13/0468* (2013.01); *H04N 13/0011* (2013.01); *H04N 13/0014* (2013.01); *H04N 13/047* (2013.01); *H04N 13/0477* (2013.01)

(58) Field of Classification Search
None
See application file for complete search history.

(56) References Cited

U.S. PATENT DOCUMENTS

| | | | | |
|---|---|---|---|---|
| 7,538,774 B2 * | 5/2009 | Kunita | ................ | G06T 7/0075 345/581 |
| 8,120,606 B2 * | 2/2012 | Nakamura | ............. | G03B 35/08 345/419 |
| 9,105,133 B2 * | 8/2015 | Baik | ................ | H04N 13/0011 |
| 2005/0089212 A1 * | 4/2005 | Mashitani | .......... | H04N 13/0296 382/154 |
| 2011/0255781 A1 * | 10/2011 | Hamsici | ............... | G06K 9/4671 382/170 |
| 2012/0293693 A1 * | 11/2012 | Sumitomo | ......... | H04N 13/0264 348/246 |
| 2012/0301044 A1 * | 11/2012 | Nakada | .............. | H04N 5/23229 382/255 |
| 2013/0308826 A1 * | 11/2013 | Asano | ................ | H04N 13/0022 382/106 |
| 2014/0092222 A1 * | 4/2014 | Tsubaki | ............. | H04N 13/0011 348/51 |
| 2014/0098100 A1 * | 4/2014 | Dane | .................. | H04N 13/0271 345/427 |

FOREIGN PATENT DOCUMENTS

JP    2006-115198    4/2006

* cited by examiner

*Primary Examiner* — Siamak Harandi
*Assistant Examiner* — Pinalben Patel
(74) *Attorney, Agent, or Firm* — Dentons US LLP

(57) ABSTRACT

There is provided an image processing apparatus, including a virtual viewpoint interval determination section which determines virtual viewpoint intervals corresponding to an image to be processed based on a parallax corresponding to the image to be processed and an image feature amount for each pixel in the image to be processed.

13 Claims, 6 Drawing Sheets

| EVALUATION POINT | 5 STEP DETERIORATION MEASURE |
|---|---|
| 5 | NOT RECOGNIZED |
| 4 | RECOGNIZED BUT NOT NOTICED |
| 3 | NOTICED BUT NOT DISTURBING |
| 2 | BECOMES DISTURBING |
| 1 | BECOMES VERY DISTURBING |

HIGH QUALITY ↑↓ LOW QUALITY

· · DETECTION LIMIT 4.5
· · ACCEPTABILITY LIMIT 3.5
· · ENDURANCE LIMIT 2.5

VIRTUAL VIEWPOINT INTERVAL DETERMINATION SECTIONS APPARATUS AND METHOD

CROSS REFERENCE TO RELATED APPLICATIONS

This application claims the benefit of Japanese Priority Patent Application JP 2013-111031 filed May 27, 2013, the entire contents of which are incorporated herein by reference.

BACKGROUND

The present disclosure relates to an image processing apparatus and an image processing method.

For example, devices have become widely available which are capable of allowing a user to recognize displayed images as a stereoscopic image, by displaying an image corresponding to the left eye of the user (hereinafter, expressed as "left eye image" or "L image") and an image corresponding to the right eye of the user (hereinafter, expressed as "right eye image" or "R image") on a display screen. Devices such as those described above allow a user to recognize displayed images as a stereoscopic image by using parallax.

Further, display devices have been developed which are capable of displaying images with a plural number of viewpoints, such as 6 viewpoints or 9 viewpoints. In devices such as those described above, an image with a plural amount of viewpoints is displayed, at light condensing distances in the image corresponding to each of the viewpoints (hereinafter, there will be cases where these are expressed as "viewpoint images"), by arranging a plurality of viewpoint images with a different parallax, and periodically repeating the display of the viewpoint images horizontally with respect to the display screen.

Therefore, for example, since a plurality of normal vision regions are included in display devices such as those described above, having a plurality of users (viewers who view an image displayed on the display screen. Hereinafter, this will be assumed to be the same) simultaneously view a stereoscopic image will be realized. Further, for example, since display devices such as those described above are capable of allowing different viewpoint images to be viewed in accordance with the positions at which the users view the image on the display screen (hereinafter, there will be cases where this is expressed as "viewing position"), a stereoscopic image in which motion parallax reappears can be provided to the users.

Here, for example, images captured at different positions by an imaging apparatus can be included as viewpoint images corresponding to each of a plurality of viewpoints. However, in the case where viewpoint images corresponding to each of a plurality of viewpoints are set as images captured at different positions by an imaging apparatus, it will be costly. Accordingly, for example, technology has been developed related to the generation of images in virtual viewpoint positions (images in virtual imaging positions), based on a left eye image and a right eye image which constitute a stereoscopic image. For example, technology is included in JP 2006-115198A as technology related to the generation of images in virtual viewpoint positions, for example, based on a left eye image and a right eye image which constitute a stereoscopic image.

SUMMARY

In the case where two or more viewpoint images are generated from a left eye image and a right eye image which constitute a stereoscopic image (including an image artificially generated from a planar image (2D image), intervals between the viewpoint images (hereinafter, expressed as "virtual viewpoint intervals") will be set to a constant interval, for example, with a parallax amount between the left eye image and the right eye image used as a viewpoint interval reference (for example, "1"). Also, viewpoint images are generated, in which the virtual viewpoint intervals are a constant interval with a parallax amount between the left eye image and the right eye image used as a viewpoint interval reference. Hereinafter, there will be cases where the virtual viewpoint intervals being a constant interval with a parallax amount between the left eye image and the right eye image used as a viewpoint interval standard is expressed as "the virtual viewpoint intervals are constant".

However, for example, in the case where a plurality of viewpoint images are generated in which the virtual viewpoint intervals are constant, there may be the occurrence of the parallax between the left eye image and the right eye image according to an image of a processing target (hereinafter, this will be expressed as an "image to be processed") becoming large, and the parallax in the plurality of generated viewpoint images becoming too large. Further, for example, in the case where the parallax of the plurality of viewpoint images becomes too large, a decrease in image quality may occur, such as a stereoscopic image being doubly recognized by the user (hereinafter, this will be expressed as a "double image"), a stereoscopic image being recognized as lacking focus by the user (hereinafter, this will be expressed as "lack of focus"), or motion parallax of a stereoscopic image being recognized as discontinuous by the user, when displaying a stereoscopic image on a display screen. In addition, when the parallax of the plurality of viewpoint images becomes too large, in the case where a user views an image displayed on the display screen at a position shifted backwards or forwards from a set viewing distance, a decrease in image quality may occur, such as regions where the depth is inversed, which is called a reverse view, being perceived in bands by the user. Also, in the case where a decrease in image quality such as that described above occurs, there is a high possibility of the user having an unpleasant feeling.

Here, for example, reducing the parallax by reducing the virtual viewpoint intervals can be considered as a method for preventing a decrease in image quality such as that described above. However, for example, in the case where a plurality of viewpoint images are generated in which the virtual viewpoint intervals are constant, there may be the occurrence of the parallax between the left eye image and the right eye image in accordance with the image to be processed becoming small, and the parallax in the plurality of generated viewpoint images becoming too small. Further, for example, in the case where the parallax of the plurality of viewpoint images becomes too small, there may be the occurrence of an image lacking a stereoscopic effect being displayed on the display screen, or a stereoscopic effect not able to be sufficiently recognized by the user.

Therefore, for example, in the case where the virtual viewpoint intervals are made constant, an undesirable situation may occur, such as a decrease in image quality or a stereoscopic effect not able to be sufficiently recognized by the user.

The present disclosure proposes a new and improved image processing apparatus and image processing method capable of determining virtual viewpoint intervals corresponding to an image to be processed.

According to the present disclosure, there is provided an image processing apparatus, including a virtual viewpoint interval determination section which determines virtual viewpoint intervals corresponding to an image to be processed based on a parallax corresponding to the image to be processed and an image feature amount for each pixel in the image to be processed.

According to the present disclosure, there is provided an image processing method, including determining virtual viewpoint intervals corresponding to an image to be processed based on a parallax corresponding to the image to be processed and an image feature amount for each pixel in the image to be processed.

According to the present disclosure, virtual viewpoint intervals corresponding to an image to be processed can be determined.

DETAILED DESCRIPTION OF THE EMBODIMENT(S)

Figure 1:
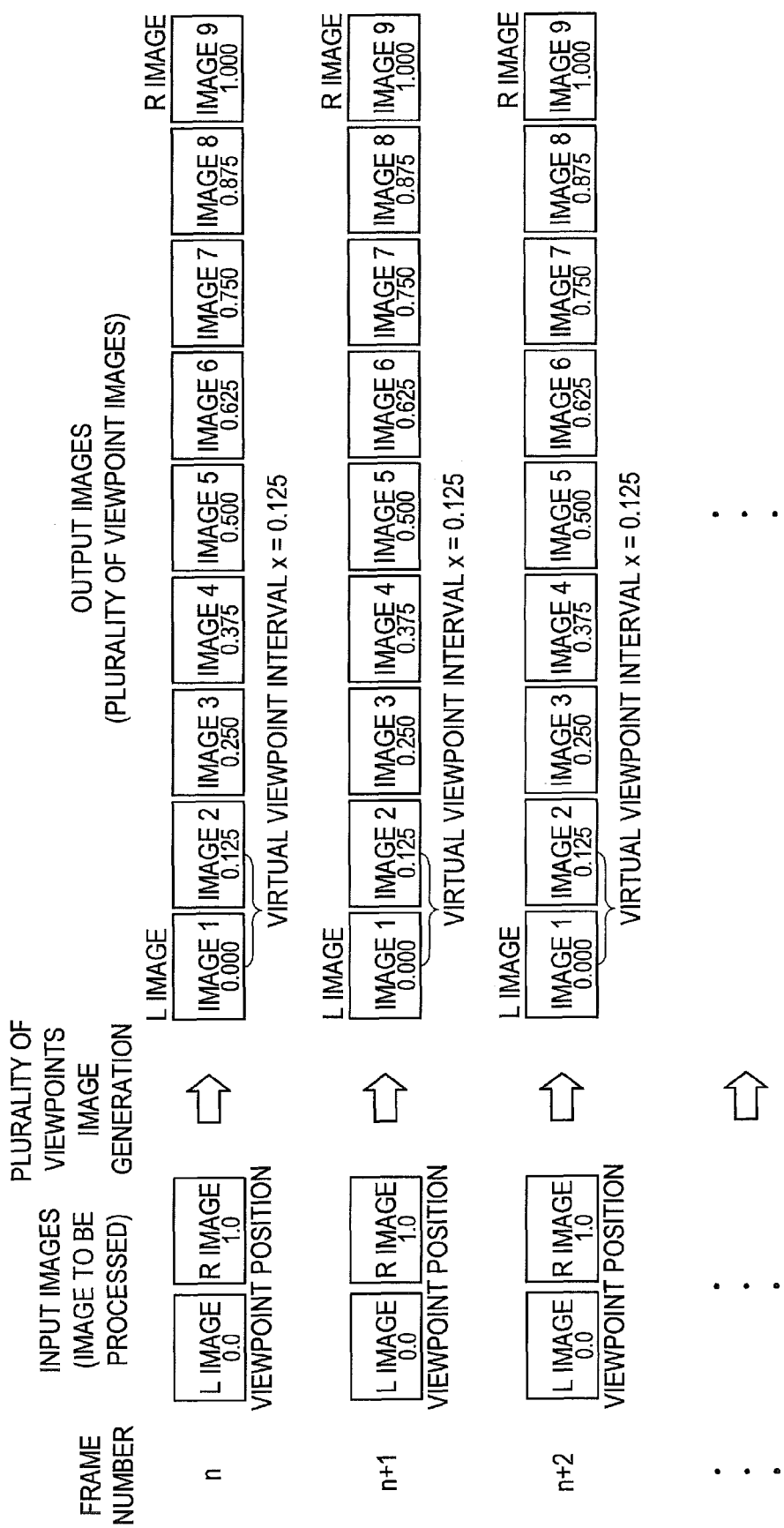
FIG. 1 is an explanatory diagram for describing a problem in the case where virtual viewpoint intervals are made constant.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will be given in the following order.

1. Image processing method according to the present embodiment

2. Image processing apparatus according to the present embodiment

3. Program according to the present embodiment (Image Processing Method According to the Present Embodiment)

First, before a configuration of an image processing apparatus according to the present embodiment is described, an image processing method according to the present embodiment will be described. Hereinafter, the image processing method according to the present embodiment will be described, by including an example in the case where the image processing apparatus according to the present embodiment performs processes related to the image processing method according to the present embodiment.

[I] Problems which May Occur in the Case where the Virtual Viewpoint Intervals are Made Constant As described above, in the case where two or more viewpoint images are generated from a left eye image and a right eye image which constitute a stereoscopic image, for example, virtual viewpoint intervals will be set to a constant interval, with a parallax amount between the left eye image and the right eye image used as a viewpoint interval reference. Also, viewpoint images may be generated, in which the virtual viewpoint intervals are a constant interval with a parallax amount between the left eye image and right eye image used as a viewpoint interval reference.

To include a specific example, in the case where two or more viewpoint images are generated from a left eye image and a right eye image which constitute a stereoscopic image, the parallax amount between the left eye image and the right eye image will be set as "1", and the virtual viewpoint intervals will be fixed to x (0<x<1). Also, a plurality of viewpoint images corresponding to the virtual viewpoint intervals x are generated for an image to be processed.

FIG. 1 is an explanatory diagram for describing a problem in the case where the virtual viewpoint intervals are made constant. FIG. 1 shows an example in the case where a plurality of viewpoint images (output images shown in FIG. 1) are generated with virtual viewpoint intervals x fixed at 0.125, based on a left eye image and a right eye image (input images shown in FIG. 1) which constitute a stereoscopic image. Further, FIG. 1 shows an example of viewpoint images generated in each frame, in the case where a moving image constituted by a plurality of frames of frame numbers n (n is an integer of 1 or more), n+1, n+2, and so on. Note that, the plurality of viewpoint images (output images shown in FIG. 1) in each frame shown in FIG. 1 can be included as an example of viewpoint images generated in the case where still images are processed.

In the case where the virtual viewpoint intervals are constant, a plurality of viewpoint images will be generated by making the set virtual viewpoint intervals x a fixed value, even if the frames in the moving image change, for example, such as shown in the frame numbers n (n is an integer of 1 or more), n+1, n+2 shown in FIG. 1.

However, as described above, in the case where the virtual viewpoint intervals are made constant, for example, an undesirable situation may occur, such as the occurrence of a decrease in image quality (in the case where the parallax between the left eye image and the right eye image is large), or a stereoscopic effect not being able to be sufficiently recognized by the user (in the case where the parallax between the left eye image and the right eye image is small).

[II] Outline of the Image Processing Method According to the Present Embodiment

Accordingly, the image processing apparatus according to the present embodiment determines virtual viewpoint intervals corresponding to an image to be processed, without making the virtual viewpoint intervals constant for the image to be processed.

More specifically, for example, the image processing apparatus according to the present embodiment determines virtual viewpoint intervals corresponding to an image to be processed, based on a parallax corresponding to the image to be processed and an image feature amount for each pixel in the image to be processed (virtual viewpoint interval determination process).

Here, for example, an image which shows a left eye image and a right eye image which constitute a stereoscopic image (hereinafter, there will be cases where this is generically expressed as a "stereo image"), an image which shows a stereo image artificially generated from a planar image, and an image which shows a planar image, can be included as the image to be processed according to the present embodiment. Hereinafter, a stereo image and an artificially generated stereo image will be generically expressed as a "stereo image".

Further, a still image or a moving image can be included as the image to be processed according to the present embodiment. In the case where the image to be processed according to the present embodiment is a moving image, images (frame images) corresponding to each frame of the image to be processed are processed for each frame of the image to be processed.

Further, for example, a parallax obtained from the image to be processed can be included as the parallax corresponding to the image to be processed according to the present embodiment. In the case where the image to be processed is a stereo image, for example, the image processing apparatus according to the present embodiment calculates a parallax for each pixel, by using an arbitrary method capable of calculating the parallax for each pixel such as comparing pixels corresponding to a left eye image and a right eye image which constitute the stereo image, or a parallax corresponding to specific pixels (for example, pixels corresponding to an object detected from the stereo image or the like). Also, for example, the image processing apparatus according to the present embodiment sets a parallax corresponding to an average value of the calculated parallax for each pixel, or the calculated parallax corresponding to specific pixels, as the parallax corresponding to the image to be processed.

Note that, the parallax corresponding to the image to be processed according to the present embodiment is not limited to that described above.

For example, the image processing apparatus according to the present embodiment may set a depth in the image to be processed according to the present embodiment as the parallax corresponding to the image to be processed. For example, the image processing apparatus according to the present embodiment performs arbitrary processes capable of estimating a depth for the image to be processed according to the present embodiment, and estimates a depth in the image to be processed according to the present embodiment. Then, the image processing apparatus according to the present embodiment sets the estimated depth as the parallax corresponding to the image to be processed.

Further, for example, the image processing apparatus according to the present embodiment may set a parallax for each pixel shown by parallax information as the parallax corresponding to the image to be processed, by using parallax information which shows the parallax (or depth) for each pixel of the image to be processed according to the present embodiment.

Here, for example, the parallax information according to the present embodiment may be meta-data of the image to be processed according to the present embodiment, or may be data different to that of the image to be processed according to the present embodiment. For example, the parallax for each pixel shown by the parallax information according to the present embodiment may be set by analyzing the image to be processed according to the present embodiment, or may be set based on user operations or the like. For example, the parallax information according to the present embodiment is generated prior to performing the processes related to the image processing method according to the present embodiment, in an external apparatus of the image processing apparatus according to the present embodiment, or in the image processing apparatus according to the present embodiment.

Further, the image feature amount according to the present embodiment quantitatively shows the features of the image to be processed according to the present embodiment. For example, one or two or more out of a value which shows contrast, a value which shows a special frequency and a value which shows color saturation can be included as the image feature amount according to the present embodiment. Note that, the image feature amount according to the present embodiment is not limited to that described above. For example, a value corresponding to an arbitrary index capable of quantitatively showing the features of the image to be processed may be included in the image feature amount according to the present embodiment. Hereinafter, an example of processes related to the image processing method according to the present embodiment will be described, by including an example in the case where the image feature amount according to the present embodiment is a value which shows contrast.

Virtual viewpoint intervals corresponding to the image to be processed are determined, based on a parallax corresponding to the image to be processed and an image feature amount for each pixel in the image to be processed, by having the image processing apparatus according to the present embodiment perform a virtual viewpoint interval determination process according to the present embodiment. That is, for example, the virtual viewpoint intervals corresponding to the image to be processed, which are determined by the virtual viewpoint interval determination process according to the present embodiment, may be automatically changed for each image to be processed, in accordance with information (parallax, image feature amount) related to the image to be processed.

Therefore, virtual viewpoint intervals corresponding to the image to be processed can be determined, by having the image processing apparatus according to the present embodiment perform the virtual viewpoint interval determination process according to the present embodiment. Further, the generation of the above described problems which may occur in the case where the virtual viewpoint intervals are made constant can be prevented, by having the image processing apparatus according to the present embodiment perform the virtual viewpoint interval determination process according to the present embodiment. Note that, a specific example of the virtual viewpoint interval determination process according to the present embodiment will be described later.

Note that, the processes related to the image processing method according to the present embodiment are not limited to that of the virtual viewpoint interval determination process according to the present embodiment.

For example, it is possible for the image processing apparatus according to the present embodiment to determine virtual viewpoint positions corresponding to the image to be processed (hereinafter, expressed as a "virtual viewpoint positions"), based on the virtual viewpoint intervals corresponding to the image to be processed, which are determined in the virtual viewpoint interval determination process according to the present embodiment (virtual viewpoint position determination process). A specific example of the virtual viewpoint position determination process according to the present embodiment will be described later.

Further, for example, the image processing apparatus according to the present embodiment may also selectively generate images corresponding to the virtual viewpoint positions (hereinafter, expressed as a "virtual viewpoint images"), which are determined in the virtual viewpoint position determination process according to the present embodiment, based on the image to be processed (virtual viewpoint image generation process).

Here, for example, virtual viewpoint images generated by the image processing apparatus according to the present embodiment are images regenerated on the basis of the image to be processed, in accordance with viewpoint intervals based on the virtual viewpoint intervals determined in the virtual viewpoint interval determination process according to the present embodiment. The image processing apparatus according to the present embodiment generates virtual viewpoint images, based on processes according to an arbitrary image generation method.

Further, for example, the image processing apparatus according to the present embodiment does not generate virtual viewpoint images, in the case where the number of viewpoint positions determined in the virtual viewpoint position determination process and the number of images which constitute the image to be processed are equal, or in the case where the virtual viewpoint interval determined in the virtual viewpoint interval determination process according to the present embodiment is equal to the viewpoint interval in the image to be processed. To include a specific example, for example, a display device on which images are displayed is a device for displaying images respectively corresponding to the left eye and the right eye of the user by using a glasses type display device or the like or a liquid crystal shutter or the like, an image to be processed is a stereo image, and virtual viewpoint images are not generated in the case where the determined virtual viewpoint interval is equal to the viewpoint interval in the image to be processed.

Further, for example the image processing apparatus according to the present embodiment generates virtual viewpoint images, in cases other than the case where the above described virtual viewpoint image is not generated, such as a case where the number of viewpoint positions generated in the virtual viewpoint position determination process according to the present embodiment is larger than the number of images which constitute the image to be processed.

Figure 2:
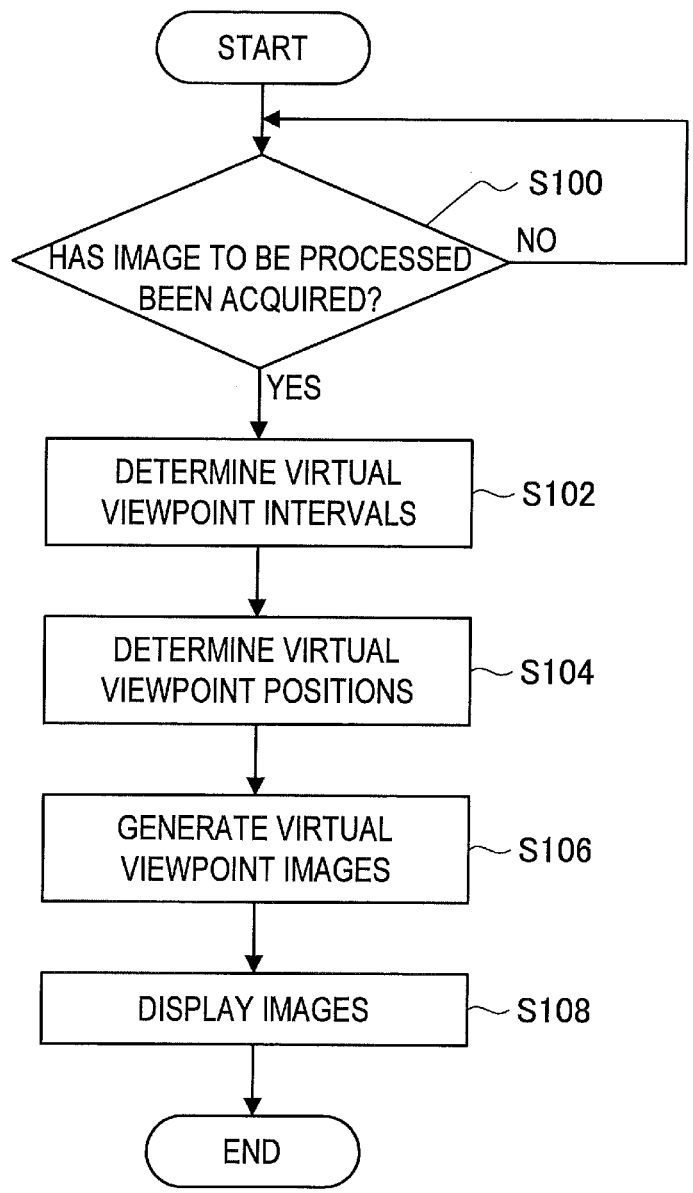
FIG. 2 is a flow chart which shows an example of processes by an image processing method according to a present embodiment.

FIG. 2 is a flow chart which shows an example of the processes related to the image processing method according to the present embodiment. Here, the process of step S102 shown in FIG. 2 corresponds to the virtual viewpoint interval determination process according to the present embodiment. Further, the process of step S104 shown in FIG. 2 corresponds to the virtual viewpoint position determination process according to the present embodiment, and the process of step S106 shown in FIG. 2 corresponds to the virtual viewpoint image generation process according to the present embodiment.

The image processing apparatus according to the present embodiment judges whether or not an image to be processed has been acquired (S100). For example, the image processing apparatus according to the present embodiment judges that an image to be processed has been acquired, from a storage section (described later) or a recording medium such as an external recording medium, in the case where image data showing the image to be processed is read, or in the case where image signals (analogue signals/digital signals) showing the image to be processed are received from an external apparatus via a communication section (described later).

In step S100, in the case where it is not judged that an image to be processed has been acquired, the image processing apparatus according to the present embodiment does not proceed with the processes until it is judged that an image to be processed has been acquired.

Further, in step S100, in the case where it is judged that an image to be processed has been acquired, the image processing apparatus according to the present embodiment determines virtual viewpoint intervals corresponding to the image to be processed (S102). Here, for example, the image processing apparatus according to the present embodiment determines virtual viewpoint intervals corresponding to the image to be processed, based on a parallax corresponding to the image to be processed and an image feature amount for each pixel in the image to be processed.

The image processing apparatus according to the present embodiment determines virtual viewpoint positions corresponding to the image to be processed, based on the virtual viewpoint intervals corresponding to the image to be processed, which are determined in step S102 (S104).

The image processing apparatus according to the present embodiment selectively generates virtual viewpoint images, which correspond to the virtual viewpoint positions determined in step S104, based on the image to be processed (S106).

The image processing apparatus according to the present embodiment displays the image to be processed, and the virtual viewpoint images selectively generated in step S106, on a display screen (S108). For example, the image processing apparatus according to the present embodiment performs mapping, and displays images on the display screen, by transmitting signals which include image data showing the displayed images, and control instructions controlling the display, to the display device.

Here, for example, a display device capable of forming images corresponding to each of the left eye and the right eye of a user, by collating each viewpoint image at a constant set viewing distance from the display screen, such as a naked eye 3D display using a lens or barrier, can be included as the display device according to the present embodiment (hereinafter, there will be cases where this is expressed as a "display device corresponding to naked eye 3D"). Further, the display device according to the present embodiment may be a display device in which a corresponding image for each of the left eye and right eye of the user are displayed by using a glasses type display device or the like, or a liquid crystal shutter or the like (hereinafter, there will be cases this is expressed as "a display device corresponding to a glasses type 3D"). Hereinafter, an example of processes by the image processing method according to the present embodiment will be described, by mainly including an example in the case where the display device according to the present embodiment is a display device corresponding to naked eye 3D.

The image processing apparatus according to the present embodiment performs the processes shown in FIG. 2, for example, as the processes related to the image processing method according to the present embodiment. For example, by performing the processes shown in FIG. 2, virtual viewpoint intervals corresponding to the image to be processed are determined, and images based on the determined virtual viewpoint intervals are displayed on the display screen.

Note that, the processes related to the image processing method according to the present embodiment are not limited to the processes shown in FIG. 2.

For example, the image processing apparatus according to the present embodiment may be allowed to record the image to be processed and the virtual viewpoint images selectively generated in step S106 to a recording medium such as a storage section (described later), without performing the process of step S108, or along with the process of step S108.

Further, for example, the display device according to the present embodiment is a device for displaying images respectively corresponding to the left eye and the right eye of a user by using a glasses type display device or the like, or a liquid crystal shutter or the like, and in the case where the image to be processed is a stereo image, it is possible for the image processing apparatus according to the present embodiment to not perform the process of step S104 and/or the process of step S106.

The image processing apparatus according to the present embodiment can determine virtual viewpoint intervals corresponding to the image to be processed, by the process of step S102, even in the case where the image processing apparatus according to the present embodiment performs the processes according to a modified example of FIG. 2, such as that described above.

(Image Processing Apparatus According to the Present Embodiment)

Hereinafter, an example of the processes by the image processing method according to the present embodiment will be described in more detail while describing an example of a configuration of the image processing apparatus according to the present embodiment.

Figure 3:
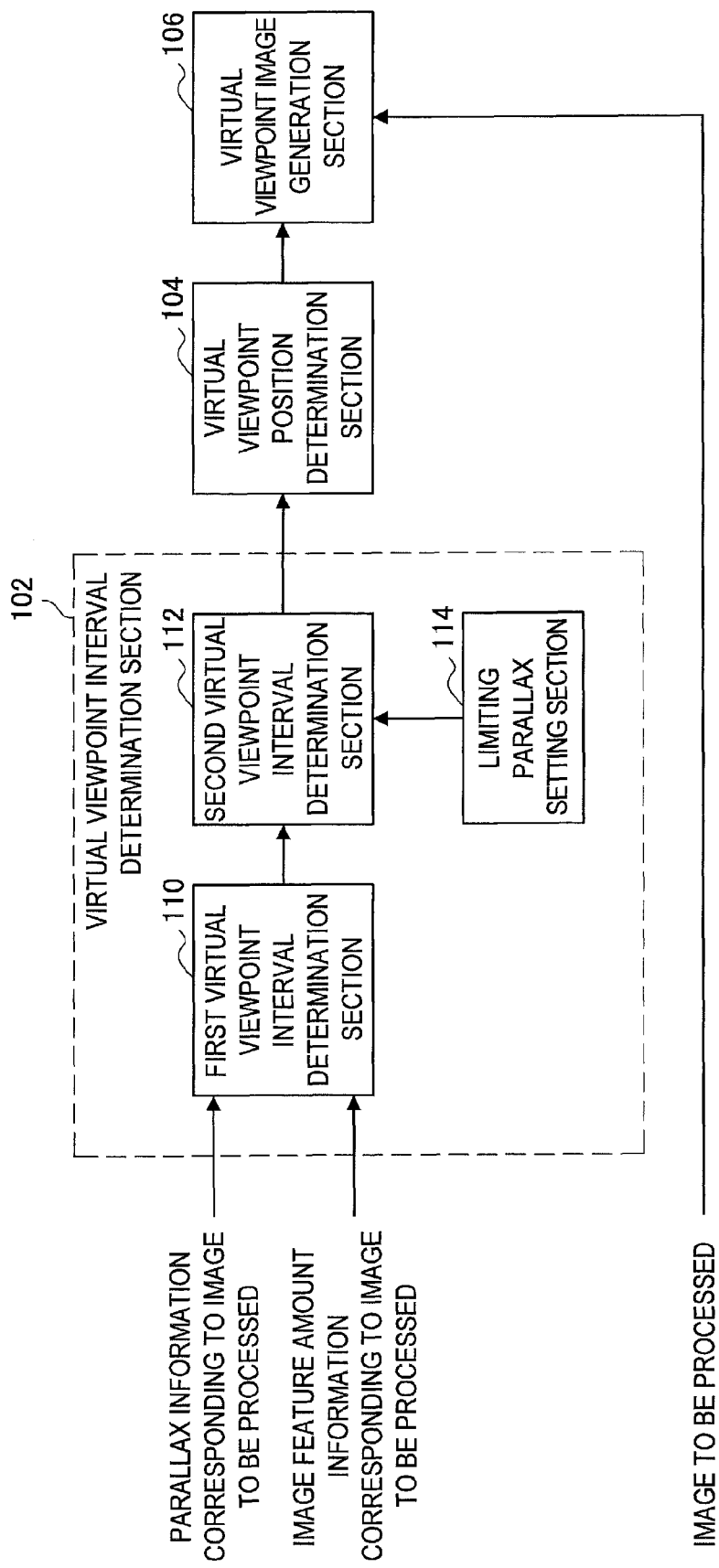
FIG. 3 is a block diagram which shows an example of a configuration of an image processing apparatus according to a present embodiment.

FIG. 3 is a block diagram which shows an example of a configuration of the image processing apparatus 100 according to the present embodiment. For example, the image processing apparatus 100 includes a virtual viewpoint interval determination section 102, a virtual viewpoint position determination section 104, and a virtual viewpoint image generation section 106.

Further, for example, the image processing apparatus 100 may include a control section (not shown in the figures), a ROM (Read Only Memory—not shown in the figures), a RAM (Random Access Memory—Not shown in the figures), a storage section (not shown in the figures), a communication section (not shown in the figures), an operation section capable of being operated by a user (not shown in the figures), a display section (not shown in the figures) or the like. For example, the image processing apparatus 100 connects to each of the above described constituent elements by a bus as a transmission line of data.

Here, the control section (not shown in the figures) is constituted by an MPU (Micro Processing Unit), various processing circuits or the like, and controls the entire image processing apparatus 100.

Further, the control section (not shown in the figures) may serve the purpose of performing processes according to a display control which allows images to be displayed, in a display device which constitutes the display section (not shown in the figures), an external display device or the like. For example, the process of step S108 shown in FIG. 2 or the like can be included as the process according to a display control according to the present embodiment. Note that, it is possible for the image processing apparatus 100 to include a display control section (not shown in the figures), which proactively performs the process by a display control according to the present embodiment, separately from the control section (not shown in the figures) (for example, the display control section (not shown in the figures) is realized by a processing circuit in a separate body from the control section (not shown in the figures)).

Further, the control section (not shown in the figures) may include the virtual viewpoint interval determination section 102, the virtual viewpoint position determination section 104 and the virtual viewpoint image generation section 106, and may serve the purpose of proactively performing processes by the image processing method according to the present embodiment. Note that, it is possible for the image processing apparatus 100 to include one or two or more of the virtual viewpoint interval determination section 102, the virtual viewpoint position determination section 104 and the virtual viewpoint image generation section 106 separately from the control section (not shown in the figures) (for example, one or two or more of the virtual viewpoint interval determination section 102, the virtual viewpoint position determination section 104 and the virtual viewpoint image generation section 106 are realized by a processing circuit in a separate body from the control section (not shown in the figures)).

The ROM (not shown in the figures) stores data for the control of programs and calculation parameters used by the control section (not shown in the figures) or the like. The RAM (not shown in the figures) temporarily stores the programs or the like which are executed by the control section (not shown in the figures) or the like.

For example, the storage section (not shown in the figures) is a storage mechanism included in the image processing apparatus 100, and stores image data which shows images such as an image to be processed, and various types of data by the image processing method according to the present embodiment (for example, data which shows an evaluation function, association information, information related to the display device or the like, which will be described later). Further, for example, the storage section (not shown in the figures) may store various types of data such as applications. Here, for example, a magnetic recording medium such as a hard disk, or a nonvolatile memory such as an EEPROM (Electrically Erasable and Programmable Read Only Memory) or a flash memory, can be included as the storage section (not shown in the figures). Further, the storage section (not shown in the figures) may be detachable from the image processing apparatus 100.

The communication section (not shown in the figures) is a communication mechanism included in the image processing apparatus 100, and functions as a server, an external apparatus such as a display device according to the present embodiment capable of displaying images on a display screen, and a communication section which performs wireless/wired communication (the communication section), via a network (or directly). Here, for example, a communication antenna and an RF (Radio Frequency) circuit (wireless communication), an IEEE802.15.1 port and a transmission/reception circuit (wireless communication), an IEEE802.11b port and a transmission/reception circuit (wireless communication), or a LAN (Local Area Network) terminal and a transmission/reception circuit (wired communication), can be included as the communication section (not shown in the figures). Further, for example, a wired network such as a LAN or WAN (Wide Area Network), a wireless network such as a wireless WAN (WWAN; Wireless Wide Area Network) via a wireless LAN (WLAN; Wireless Local Area Network) or a base station, or the internet using a communication protocol such as a TCP/IP (Transmission Control Protocol/Internet Protocol), can be included as the network according to the present embodiment.

The operation section (not shown in the figures) is an operation mechanism, included in the image processing apparatus 100, which is capable of being operated by a user. For example, buttons, a directional keyboard, a rotation type selector such as a jog dial, or a combination of these, can be included as the operation section (not shown in the figures).

The display section (not shown in the figures) is a display mechanism included in the image processing apparatus 100, for example, and displays various types of images, such as an image to be processed and virtual viewpoint images, on a display screen. For example, the display device according to the present embodiment, such as a glasses type display device corresponding to glasses type 3D, or a naked eye 3D device corresponding to naked eye 3D, can be included as the display section (not shown in the figures).

(1) The Virtual Viewpoint Interval Determination Section 102

The virtual viewpoint interval determination section 102 serves the purpose of proactively performing the virtual viewpoint interval determination process according to the present embodiment. The virtual viewpoint interval determination section 102 determines virtual viewpoint intervals corresponding to an image to be processed, based on a parallax corresponding to the image to be processed, and an image feature amount for each pixel in the image to be processed.

Here, FIG. 3 shows an example, in which parallax information according to the present embodiment and image feature amount information showing an image feature amount according to the present embodiment are transmitted to the virtual viewpoint interval determination section 102, and the virtual viewpoint interval determination section 102 performs a process, based on the transmitted parallax information and image feature amount information. Note that, the configuration of the image processing apparatus according to the present embodiment is not limited to that of the example shown in FIG. 3. For example, in the image processing apparatus according to the present embodiment, an image to be processed may be transmitted to the virtual viewpoint interval determination section 102. In the case where an image to be processed is transmitted to the virtual viewpoint interval determination section 102, for example, the virtual viewpoint interval determination section 102 analyzes the image to be processed, and performs a process by using the parallax information according to the present embodiment and the image feature amount according to the present embodiment, which are obtained by analyzing the image to be processed.

For example, the virtual viewpoint interval determination section 102 includes a first virtual viewpoint interval determination section 110, a second virtual viewpoint interval determination section 112, and a limiting parallax setting section 114.

(1-1) Example of Processes in the First Virtual Viewpoint Interval Determination Section 110

The first virtual viewpoint interval determination section 110 determines a virtual viewpoint interval for each prescribed pixel unit, based on a parallax corresponding to the image to be processed, an image feature amount for each pixel, and a display quality value.

Here, for example, the display quality value according to the present embodiment is a value which quantitatively shows the quality when an image is displayed on a display screen. A specific example of the display quality value according to the present embodiment will be described later.

Further, for example, one pixel or a plurality of pixels (for example, m×n pixels such as 3×3 pixels or 5×5 pixels (m and n are each integers of one or more. However, the case of m=1 and n=1 is excluded)) can be included as the prescribed pixel unit according to the present embodiment. In the case where the prescribed pixel unit according to the present embodiment is one pixel, a virtual viewpoint interval is determined for each pixel. Further, in the case where the prescribed pixel unit according to the present embodiment is a plurality of pixels, one virtual viewpoint interval is determined for each of the plurality of pixels. The prescribed pixel unit according to the present embodiment may be predetermined, or may be arbitrarily set by a user or the like of the image processing apparatus according to the present embodiment.

More specifically, for example, the first virtual viewpoint interval determination section 110 determines a virtual viewpoint interval for each pixel unit, by performing a process according to the first example shown below, or a process according to the second example shown below. Hereinafter, an example will mainly be included, in the case where the prescribed pixel unit according to the present embodiment is one pixel, that is, in the case where the first virtual viewpoint interval determination section 110 determines a virtual viewpoint interval for each pixel. Note that, in the case where the prescribed pixel unit according to the present embodiment is a plurality of pixels, for example, it is possible for the first virtual viewpoint interval determination section 110 to determine a virtual viewpoint interval for each plurality of pixels, similar to the case of determining a virtual viewpoint interval for each pixel, which will be described later, by using a representative value of an image feature amount of the plurality of pixels (for example, an average value, a maximum value, a minimum value or the like).

(1-1-1) First Example of Processes in the First Virtual Viewpoint Interval Determination Section 110

For example, the first virtual viewpoint interval determination section 110 determines a virtual viewpoint interval for each pixel, by using an evaluation function in which the display quality value is represented by a relation between the parallax and image feature amount corresponding to the image to be processed. Note that, as described above, it is possible for the first virtual viewpoint interval determination section 110 to determine the virtual viewpoint interval for each plurality of pixels.

For example, the first virtual viewpoint interval determination section 110 reads data, which shows the evaluation function according to the present embodiment, from a recording medium such as the storage section (not shown in the figures). Further, for example, the first virtual viewpoint interval determination section 110 calculates a virtual viewpoint interval for each pixel, by applying the parallax corresponding to the image to be processed, which is shown by the parallax information according to the present embodiment, and the image feature amount for each pixel, which is shown by the image feature amount information according to the present embodiment, to the evaluation function shown by the read data. Also, the first virtual viewpoint interval determination section 110 determines the virtual viewpoint interval calculated for each pixel as a virtual viewpoint interval for each pixel.

First, an example of a generation method of the evaluation function according to the present embodiment will be described.

For example, the evaluation function according to the present embodiment is obtained by displaying an evaluation image which changes the parallax or contrast on the display screen, and functionizing an evaluation result which subjectively evaluates the quality of a stereoscopic image displayed on the display screen by an evaluator. Here, for example, a stereoscopic effect, a double image/lack of focus, discomfort from a reverse view, the nature of motion parallax or the like, can be included as an index which evaluates the quality of a stereoscopic image according to the present embodiment. Hereinafter, an example of the processes by the image processing method according to the present embodiment will be described, by including an example in the case where the index which evaluates the quality of a stereoscopic image according to the present embodiment is a "double image/lack of focus".

For example, the evaluation of the quality of a stereoscopic image displayed on the display screen, by the evaluator, is performed by separately evaluating the index which evaluates the quality of a stereoscopic image according to the above described present embodiment, or comprehensively evaluating this index. Further, for example, it is possible for the evaluation of the quality of a stereoscopic image according to the present embodiment to be performed by a subjective evaluation using a 5 step deterioration measure.

Figures 4, 5:
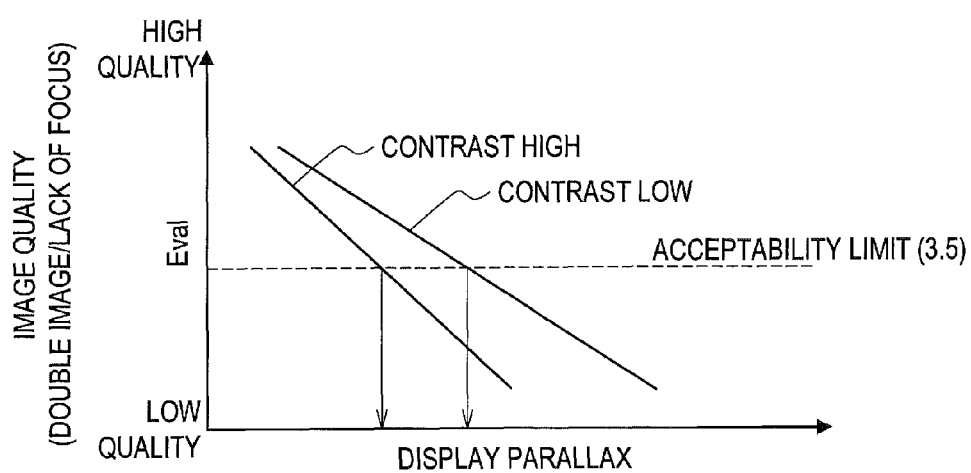
FIG. 4 is an explanatory diagram for describing an example of an evaluation method of quality for a stereoscopic image displayed on a display screen according to a present embodiment.
FIG. 5 is an explanatory diagram which shows an example of an evaluation result of quality for a stereoscopic image displayed on a display screen according to a present embodiment.

FIG. 4 is an explanatory diagram for describing an example of an evaluation method of the quality of a stereoscopic image displayed on the display screen according to the present embodiment. Here, FIG. 4 shows an example of a relation between the evaluation point and measure in a subjective evaluation using a 5 step deterioration measure. Further, the evaluation point shown in FIG. 4 corresponds to the display quality value according to the present embodiment.

For example, the evaluator subjectively evaluates the quality of a stereoscopic image displayed on the display screen, in accordance with the 5 step deterioration measure shown in FIG. 4. Note that, the evaluation method of the quality of a stereoscopic image displayed on the display screen according to the present embodiment is not limited to that of a 5 step deterioration measure such as shown in FIG. 4, and it is possible for the evaluator to evaluate the quality of a stereoscopic image displayed on the display screen, by using an arbitrary method capable of evaluating the quality of a stereoscopic image displayed on the display screen.

FIG. 5 is an explanatory diagram which shows an example of an evaluation result of the quality of a stereoscopic image displayed on the display screen according to the present embodiment. Here, FIG. 5 shows an example of an evaluation result, in which only the appearance related to a double image/lack of focus is set as an index which evaluates the quality of a stereoscopic image according to the present embodiment, and the evaluator evaluates the quality of a stereoscopic image displayed on the display screen by the 5 step deterioration measure shown in FIG. 4. Further, FIG. 5 shows an example of an evaluation result for both an evaluation image in which the contrast is large and an evaluation image in which the contrast is small. "Eval" shown in FIG. 5 shows the display quality value according to the present embodiment.

The appearance of a double image/lack of focus depends on the parallax, and the contrast of the image displayed on the display screen. Therefore, as shown in FIG. 5, when taking the parallax on the horizontal axis, the display quality value Eval in an image with different contrasts will differ. Generally, when the contrast is low, the image deterioration due to a double image or lack of focus will decrease even if the parallax is large, in comparison to the case where the contrast is large, and will become a high image quality.

For example, by applying a statistical technique such as multiple regression analysis, for example, to an evaluation result such as shown in FIG. 5, an evaluation function according to the present embodiment is obtained, such as that shown in the following Equation 1, for example. For example, in the example shown in FIG. 5, the contrast corresponds to the image feature amount shown in the following Equation 1.

$$\text{Eval}=f(\text{image feature amount,display parallax}) \quad \text{(Equation 1)}$$

More specifically, a primary linear combination equation, such as shown in Equation 2, for example, can be included as the evaluation function according to the present embodiment.

$$\begin{aligned}\text{Eval} &= f(C, \text{disparity}) & \text{(Equation 2)}\\ &\approx a \times LR \text{ luminance gradation difference} + \\ & \quad b \times \text{display parallax} + c \\ &= a \times LR \text{ luminance gradation difference} + b \times \\ & \quad LR \text{ parallax} \times \text{virtual viewpoint interval} + c\end{aligned}$$

Here, "C" shown in Equation 2 represents the contrast, and "disparity" shown in Equation 2 represents the display parallax. Further, "LR luminance gradation difference" shown in Equation 2 represents the luminance gradation difference of the pixels corresponding to a left eye image and a right eye image, and is a value which substitutes the contrast. Further, "LR parallax" shown in Equation 2 is the parallax shown by the parallax information according to the present embodiment.

Further, for example, "a", "b" and "c" shown in Equation 2 are values in accordance with information related to the display device according to the present embodiment. For example, one or two or more of the size of the display device, the crosstalk amount, the MTF (Modulation Transfer Function) characteristic, the viewpoint number, the viewpoint number between the eyes, the resolution and the luminance, can be included as information related to the display device according to the present embodiment.

For example, it is possible to set the evaluation function according to the present embodiment, for each type of information related to the display device, by having values in accordance with the display device according to the present embodiment included in the function or the like, for the evaluation function according to the present embodiment. For example, the first virtual viewpoint interval determination section 110 uses the evaluation function corresponding to information related to the display device, by referring to a table or the like in which the values shown by the information related to the display device are associated with the values of "a", "b" and "c" shown in Equation 2.

Note that, "a", "b" and "c" shown in Equation 2 are not limited to values in accordance with information related to the display device according to the present embodiment.

For example, "a", "b" and "c" shown in Equation 2 may be values in accordance with the viewing position which is a position at which the user views an image displayed on the display screen. For example, the viewing position according to the present embodiment is represented by each of a z coordinate by a viewing distance from the display screen up to the user, an x coordinate by the position (horizontal position) of the horizontal direction of the user with respect to the display screen, and a y coordinate by the position (height) of the vertical direction of the user with respect to the display screen.

For example, it is possible to set the evaluation function according to the present embodiment, for each viewing position according to the present embodiment, by having values in accordance with the viewing positions according to the present embodiment included in the function or the like, for the evaluation function according to the present embodiment. For example, the first virtual viewpoint interval determination section 110 uses the evaluation function corresponding to the viewing positions according to the present embodiment, by referring to a table or the like in which the values shown by the viewing positions according to the present embodiment (for example, coordinates) are associated with the values of "a", "b" and "c" shown in Equation 2.

Here, for example, in the case where the display device according to the present embodiment is a naked eye 3D display corresponding to naked eye 3D, there is the possibility that viewing a reverse view zone will be recognized by a user, at the time when the user views the display screen at a closer distance or further distance than that of a set viewing distance. As described above, by having the first virtual viewpoint interval determination section 110 set the evaluation function according to the present embodiment for each viewing position according to the present embodiment, for example, the image processing apparatus 100 can determine virtual viewpoint intervals corresponding to an image to be processed which are capable of preventing the generation of a reverse view.

Further, for example, "a", "b" and "c" shown in Equation 2 may be values in accordance with information related to the display device according to the present embodiment, or viewing positions which are positions at which the user views an image displayed on the display screen. For example, the first virtual viewpoint interval determination section 110 uses "an evaluation function corresponding to information related to the display device according to the present embodiment, and viewing positions which are positions at which the user views an image displayed on the display screen", by referring to a table or the like in which values shown by information related to the display device, values shown by the viewing positions according to the present embodiment (for example, coordinates) and the values of "a", "b" and "c" shown in Equation 2 are associated with each other.

Note that, the evaluation function according to the present embodiment is not limited to that of the above described Equation 2.

For example, while a luminance gradation difference of images corresponding to a left eye image and a right eye image are used as values which substitute the contrast, for example, in order to simplify the processes in the above described Equation 2, it is possible to use a value of contrast. Here, for example, a value of contrast can be obtained from a single pixel out of the left eye image and the right eye image.

Further, for example, the evaluation function according to the present embodiment may be a primary linear combination equation which does not have "a", "b" and "c" shown by the above described Equation 2.

Further, the evaluation function according to the present embodiment is not limited to a primary linear combination equation such as that shown in the above described Equation 2.

For example, if accuracy is to be obtained, the evaluation function according to the present embodiment may be a second order equation or a third order equation, or may be an arbitrary function based on the evaluation result. Hereinafter, a first example of the processes in the first virtual viewpoint interval determination section 110 will be described, by including an example in the case where the evaluation function according to the present embodiment is the primary linear combination equation shown in Equation 2.

Next, a process related to the determination of virtual viewpoint intervals according to a first example, which uses the evaluation function according to the present embodiment, will be described.

For example, the virtual viewpoint interval determination section 110 calculates a virtual viewpoint interval for each pixel, by using an evaluation function such as that shown in the above described Equation 2, and determines the virtual viewpoint interval calculated for each pixel as a virtual viewpoint interval for each pixel.

More specifically, for example, the virtual viewpoint interval determination section 110 calculates a virtual viewpoint interval for each pixel, by performing the calculation shown in the following Equation 3 based on the above described Equation 2, and determines the virtual viewpoint interval calculated for each pixel as a virtual viewpoint interval for each pixel.

$$仮想視点間隔_{(i,j)} = \frac{Eval - (a \times LR輝度階調差_{(i,j)} + c)}{b \times LR視差_{(i,j)}} \quad (数式\ 3)$$

$$\text{Virtual viewpoint } interval_{(i,j)} = \\ Eval - (a \times LR \text{ luminance gradation } difference_{(i,j)} + c) / b \times \\ LR\ parallax_{(i,j)} \quad \text{(Equation 3)}$$

Here, "(i,j)" shown in Equation 3 are coordinates which show the position of a pixel in the image to be processed. For example, the position of a pixel in the image to be processed is represented by coordinates in which an arbitrary position in the image to be processed is set as an origin. Further, "LR luminance gradation difference $_{(i,j)}$" shown in Equation 3 shows the luminance gradation difference of pixels corresponding to a left eye image and a right eye image, in the pixel corresponding to the position (i,j). Further, "LR parallax $_{(i,j)}$" shown in Equation 3 is a parallax shown by the parallax information according to the present embodiment, in the pixel corresponding to the position (i,j).

Further, "Eval" shown in Equation 3 is the display quality value according to the present embodiment, and is a set value. For example, a predetermined fixed value, or a changeable value capable of being arbitrarily set based on user operations or the like, can be set as "Eval" shown in Equation 3. For example, in the case where a subjective evaluation is performed using a 5 step deterioration measure such as that shown in FIG. 4, "3.5" which becomes an acceptability limit can be included as "Eval" shown in Equation 3. Further, for example, in the case where a stereoscopic image is desired in which a double image/lack of focus is barely visible, at the time when a subjective evaluation is performed using a 5 step deterioration measure such as that shown in FIG. 4, "4.5" which becomes a detection limit can be included as "Eval" shown in Equation 3. Note that, it is needless to say that "Eval" shown in Equation 3 is not limited to "3.5" which becomes an acceptability limit, or "4.5" which becomes a detection limit.

Further, for example, as described by referring to the above described Equation 2, values in accordance with information related to the display device according to the present embodiment, or values in accordance with the viewing positions according to the present embodiment, can be included as "a", "b" and "c" shown in Equation 3. That is, for example, by having values in accordance with the display device according to the present embodiment included in the evaluation function according to the present embodiment, for example, the virtual viewpoint interval determination section 110 can determine a virtual viewpoint interval for each pixel, by using the evaluation function set for each type of information related to the display device according to the present embodiment. Further, for example, by having values in accordance with viewing positions according to the present embodiment included in the evaluation function according to the present embodiment, for example, the virtual viewpoint interval determination section 110 can determine a virtual viewpoint interval for each pixel, by using the evaluation function set for each viewing position according to the present embodiment.

In the case where the evaluation function according to the present embodiment is set for each type of information related to the display device according to the present embodiment, the first virtual viewpoint interval determination section 110 uses the evaluation function in accordance with information related to the display device according to the present embodiment, which corresponds to a display device for displaying images. For example, the first virtual viewpoint interval determination section 110 acquires information related to the display device corresponding to a display device for displaying images, from this display device, an external apparatus such as a server, the storage section (not shown in the figures) or the like.

Further, in the case where the evaluation function according to the present embodiment is set for each viewing position according to the present embodiment, the first virtual viewpoint interval determination section 110 uses the evaluation function in accordance with an estimated viewing position of the user. Here, for example, an estimation of the viewing position of the user is estimated by analyzing captured images in which the display direction of the display screen is captured by an imaging device. For example, a process according to an estimation of the viewing position of the user may be performed by an arbitrary constituent element of the image processing apparatus 100, or may be performed by an external apparatus of the image processing apparatus 100.

(1-1-2) Second Example of Processes in the First Virtual Viewpoint Interval Determination Section 110

The processes in the first virtual viewpoint interval determination section 110 are not limited to processes using the evaluation function according to the present embodiment, such as the process according to the above described first example. For example, it is possible for the first virtual viewpoint interval determination section 110 to determine a virtual viewpoint interval for each pixel, by using association information in which a parallax corresponding to the image to be processed, an image feature amount, a display quality value and virtual viewpoint interval are associated with each other. Note that, as described above, the first virtual viewpoint interval determination section 110 may determine the virtual viewpoint interval for each plurality of pixels.

Here, for example, a table or database in which the parallax, the image feature amount, the display quality value and the virtual viewpoint interval are associated with each other can be included as association information according to the present embodiment. For example, an association of the parallax, the image feature amount, the display quality value and the virtual viewpoint interval is based on a result of the evaluation of the quality of a stereoscopic image according to the present embodiment, in the association information according to the present embodiment. That is, for example, it can be said that the association information according to the present embodiment is made into a table or database, without functionizing the result of the evaluation of the quality of a stereoscopic image according to the present embodiment. In other words, for example, the association information according to the present embodiment corresponds to a predetermined table or database, by the result of a calculation such as that shown in Equation 3, for example.

Further, for example, similar to the above described evaluation function according to the present embodiment, the association information according to the present embodiment may be set for each type of information related to the display device, or may be set for the viewing positions according to the present embodiment. Further, for example, similar to the above described evaluation function according to the present embodiment, the association information according to the present embodiment may be set for a combination of the information related to the display device and the viewing positions according to the present embodiment.

Here, in the case where the association information according to the present embodiment is set for each type of information related to the display device according to the present embodiment, for example, the first virtual viewpoint interval determination section 110 uses association information in accordance with information related to the display device according to the present embodiment, which corresponds to a display device for displaying images. Further, in the case where the association information according to the present embodiment is set for each viewing position according to the present embodiment, for example, the first virtual viewpoint interval determination section 110 uses association information in accordance with an estimated viewing position of the user. Further, in the case where the association information according to the present embodiment is set for a combination of information related to the display device and viewing positions according to the present embodiment, for example, the first virtual viewpoint interval determination section 110 uses association information in accordance with information related to the display device according to the present embodiment and an estimated viewing position of the user.

Therefore, by using association information according to the present embodiment, it is possible for the first virtual viewpoint interval determination section 110 to uniquely specify, for each pixel, a virtual viewpoint interval corresponding to the parallax according to the image to be processed, which is shown by the parallax information according to the present embodiment, the image feature amount for each pixel, which is shown by the image feature amount information according to the present embodiment, and the set display quality value according to the present embodiment. Also, the first virtual viewpoint interval determination section 110 determines the virtual viewpoint interval specified for each pixel as a virtual viewpoint interval for each pixel.

For example, the first virtual viewpoint interval determination section 110 sets a virtual viewpoint interval for each pixel unit (for each pixel or for a plurality of pixels), by performing the processes according to the above described first example or the processes according to the above described second example.

(1-2) Example of Processes in the Second Virtual Viewpoint Interval Determination Section 112

The second virtual viewpoint interval determination section 112 determines virtual viewpoint intervals corresponding to the image to be processed, based on the virtual viewpoint interval determined for each pixel in the first virtual viewpoint interval determination section 110.

More specifically, for example, the second virtual viewpoint interval determination section 112 calculates a histogram of the virtual viewpoint intervals determined for each pixel. Here, the second virtual viewpoint interval determination section 112 calculates a histogram of the virtual viewpoint intervals determined for each pixel, by performing simple polling for the bin of the histogram.

Note that, the calculation method of a histogram of the virtual viewpoint intervals determined for each pixel according to the present embodiment is not limited to that described above.

For example, the second virtual viewpoint interval determination section 112 sets a weighting for the determined virtual viewpoint intervals of pixels, and may calculate a histogram of the weighted virtual viewpoint intervals. Here, for example, the example shown below can be included as a calculation example of a histogram in the case where a weighting is set for the virtual viewpoint intervals of pixels.

Polling to the bin of the histogram, by attaching a weighting in accordance with the conspicuity of the image.

Polling to the bin of the histogram, by attaching a weighting such as the weighting in the vicinity of the center of the image being larger, and a weighting at the end portions being smaller.

Polling to the bin of the histogram, by estimating an observation region of the user in the image, and increasing the weighting of the estimated observation region, in accordance with a combination of eye tracking technologies or the like.

Polling to the bin of the histogram, by making the weighting of a portion smaller where movement by performing movement detection is large for a moving image, in the case where the image to be processed in a moving image.

Polling to the bin of the histogram of the surroundings, by attaching a Gaussian weighting or the like.

When a histogram of the virtual viewpoint intervals determined for each pixel is calculated, for example, the second virtual viewpoint interval determination section 112 determines virtual viewpoint intervals corresponding to the image to be processed, based on the calculated histogram and a set accumulated value.

Here, for example, a threshold which shows a pixel number of a prescribed ratio, from among the entire pixel number in the image to be processed, can be included as an accumulated value according to the present embodiment. For example, the accumulated value according to the present embodiment is represented by x[%] (x is 0<x<100) of all the pixels. For example, a predetermined fixed value, or a changeable value capable of being arbitrarily set based on user operations or the like, can be included as the accumulated value according to the present embodiment. To include a specific example, a value of 10[%] or less, for example, can be included as the accumulated value according to the present embodiment. Note that, it is needless to say that the accumulated value according to the present embodiment is not limited to a value of 10[%] or less.

Figure 6:
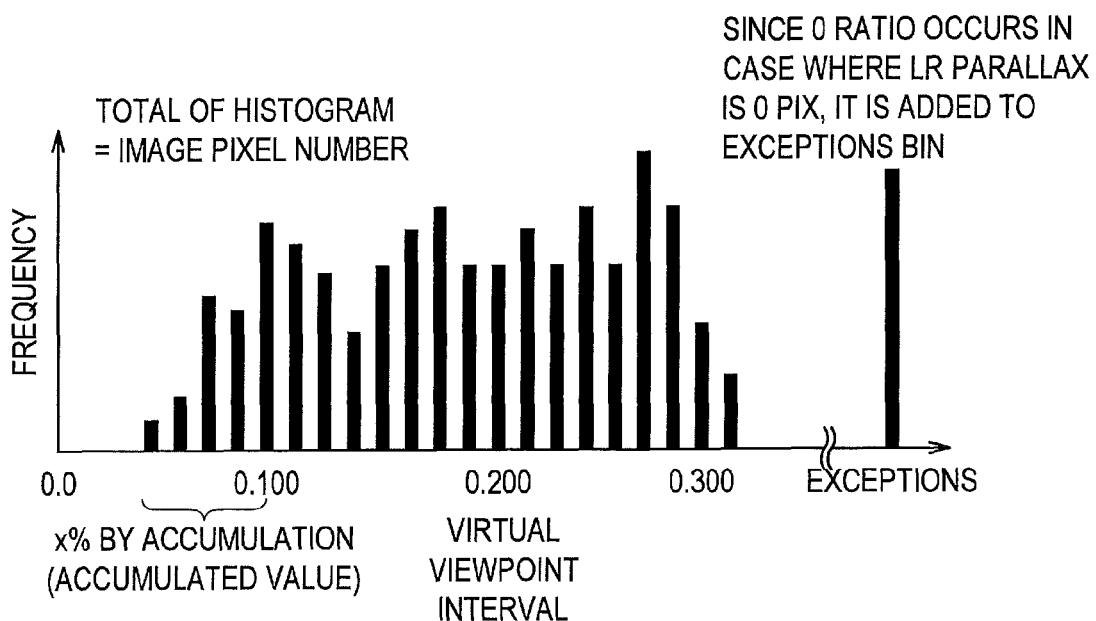
FIG. 6 is an explanatory diagram for describing an example of processes related to the determination of virtual viewpoint intervals corresponding to an image to be processed according to a present embodiment.

FIG. 6 is an explanatory diagram for describing an example of processes according to the determination of virtual viewpoint intervals corresponding to the image to be processed according to the present embodiment. Here, FIG. 6 shows an example of a histogram of the virtual viewpoint intervals determined for each pixel in some image to be processed.

For example, the second virtual viewpoint interval determination section 112 sets virtual viewpoint intervals which reach this threshold by accumulation as virtual viewpoint intervals of the entire image to be processed, by setting a ratio shown by the accumulated value as a threshold, based on the calculated histogram and accumulated value. For example, in the example shown in FIG. 6, the second virtual viewpoint interval determination section 112 sets the virtual viewpoint interval 0.1 which reaches x[%] shown by the accumulated value as a virtual viewpoint interval of the entire image to be processed.

For example, as described above, the second virtual viewpoint interval determination section 112 determines virtual viewpoint intervals corresponding to the image to be processed, based on the histogram of the virtual viewpoint intervals determined for each pixel and the set accumulated value.

Note that, the processes in the second virtual viewpoint interval determination section 112 are not limited to those described above.

For example, in the case where an upper limit value of the virtual viewpoint intervals corresponding to the image to be processed is set in the limiting parallax setting section 114, which will be described later, the second virtual viewpoint interval determination section 114 does not determine values larger than the set upper limit value as the virtual viewpoint intervals corresponding to the image to be processed.

Here, when the parallax becomes too large in the case where a stereoscopic image is displayed on the display screen, there may be the occurrence of a user not being able to fuse the images input to the left and right eyes. That is, it is not desirable for a stereoscopic image with a parallax exceeding a fusion limit to be displayed on the display screen. By having the second virtual viewpoint interval determination section 114 not determine values larger than a set upper limit value as the virtual viewpoint interval corresponding to the image to be processed, it becomes possible to prevent a stereoscopic image with a parallax exceeding a fusion limit such as described above from being displayed on the display screen.

Further, in the case where the image to be processed is a moving image, for example, the second virtual viewpoint interval determination section 112 may perform a temporal filter process for the virtual viewpoint intervals corresponding to the image to be processed.

By performing a temporal filter process for the virtual viewpoint intervals corresponding to the image to be processed, it becomes possible to reduce a temporal change amount of the virtual viewpoint intervals corresponding to the image to be processed. Therefore, by performing a temporal filter process for the virtual viewpoint intervals corresponding to the image to be processed, the second virtual viewpoint interval determination section 112 can improve a temporal stability of the virtual viewpoint intervals corresponding to the image to be processed.

Further, in the case where a temporal filter process is performed for the virtual viewpoint intervals corresponding to the image to be processed, for example, the second virtual viewpoint interval determination section 112 may set a temporal filter at a turning point of a scene in the image to be processed. Specifically, for example, the second virtual viewpoint interval determination section 112 specifies a turning point of a scene in the image to be processed, by detecting a change in the scene by performing a scene detection process for the image to be processed, and referring to information related to the image to be processed such as meta-data of the image to be processed. Also, the second virtual viewpoint interval determination section 112 sets a temporal filter, in the specified turning point of a scene in the image to be processed.

Here, in the case where a temporal filter is used similarly for all the frames of the image to be processed, for example, changes in the parallax will become duller by the temporal filter, at the time when the parallax significantly changes in the turning point of a scene, and as a result, there is the possibility of becoming a stereoscopic image with no variation. For example, as described above, by resetting a temporal filter in the turning point of a scene in the image to be processed, the second virtual viewpoint interval determination section 112 can reduce the possibility of becoming a stereoscopic image with no variation such as that described above.

(1-3) Example of Processes in the Limiting Parallax Setting Section 114

The limiting parallax setting section 114 sets an upper limit value of the virtual viewpoint intervals corresponding to the image to be processed. Further, by having the limiting parallax setting section 114 set an upper limit value, values larger than the set upper limit value are not determined as the virtual viewpoint intervals corresponding to the image to be processed by the second virtual viewpoint interval determination section 114.

As described above, it is not desirable for a stereoscopic image with a parallax exceeding a fusion limit to be displayed on the display screen. Accordingly, by including the limiting parallax setting section 114 in the image processing apparatus 100, an upper limit value is established for the virtual viewpoint interval corresponding to the image to be processed, and a virtual viewpoint interval corresponding to the image to be processed is set so as not to exceed this upper limit value in the second virtual viewpoint interval determination section 112. By having the virtual viewpoint interval corresponding to the image to be processed, which is determined in the second virtual viewpoint interval determination section 112, not exceed the set upper limit value, the display of a stereoscopic image with a parallax exceeding a fusion limit on the display screen can be prevented.

For example, the limiting parallax setting section 114 sets a prescribed value as an upper limit value of the virtual viewpoint intervals corresponding to the image to be processed. For example, a value of approximately 2 degrees (120 minutes), which is a binocular parallax giving a fusion limit (by the individual variation of users), can be included as a prescribed value which is set as an upper limit value by the limiting parallax setting section 114. Further, for example a prescribed value which is set as an upper limit value by the limiting parallax setting section 114 may be a value of 1 degree (60 minutes) or less, which is a binocular parallax of a standard for comfortable viewing, which is described in "3DC Safety Guidelines" issued by the 3D Consortium. Further, for example, a prescribed value which is set as an upper limit value by the limiting parallax setting section 114 may be a value so that the virtual viewpoint intervals is do not exceed an interval 1.0 of glasses type 3D when images are presented to the naked eye.

Note that, the upper limit value set by the limiting parallax setting section 114 is not limited to a prescribed value such as that described above.

For example, the limiting parallax setting section 114 calculates a fusion limit parallax, based on the size of the display device shown by information related to the display device according to the present embodiment, and an estimated viewing position of the user, and it is possible to set a value which is less than the fusion limit parallax calculated by the parallax in a stereoscopic image displayed on the display screen as an upper limit value. Note that, for example, in the case where the process which calculates a fusion limit parallax is calculated by another constituent element of the image processing apparatus 100 (for example, the control section (not shown in the figures), the fusion limiting parallax calculation section (not shown in the figures) or the like), the limiting parallax setting section 114 sets an upper limit value, based on the fusion limit parallax calculated by this other constituent element.

For example, by including the first virtual viewpoint interval determination section 110, the second virtual viewpoint interval determination section 112 and the limiting parallax setting section 114, the virtual viewpoint interval determination section 102 sets virtual viewpoint intervals corresponding to the image to be processed, based on the parallax corresponding to the image to be processed and the image feature amount for each pixel in the image to be processed.

Note that, the configuration of the virtual viewpoint interval determination section according to the present embodiment is not limited to that of the example shown in FIG. 3.

For example, the virtual viewpoint interval determination section according to the present embodiment may have a configuration which does not include the limiting parallax setting section 114. Even if the virtual viewpoint interval determination section according to the present embodiment has a configuration which does not include the limiting parallax setting section 114, it is possible for the virtual viewpoint interval determination section according to the present embodiment to determine a virtual viewpoint interval corresponding to the image to be processed, based on the parallax corresponding to the image to be processed and the image feature amount for each pixel in the image to be processed.

(2) The Virtual Viewpoint Position Determination Section 104

The virtual viewpoint position determination section 104 serves the purpose of proactively performing the virtual viewpoint position determination process according to the present embodiment. The virtual viewpoint position determination section 104 determines virtual viewpoint positions corresponding to the image to be processed, based on the virtual viewpoint intervals corresponding to the image to be processed, which are determined in the virtual viewpoint interval determination section 102.

Figure 7:
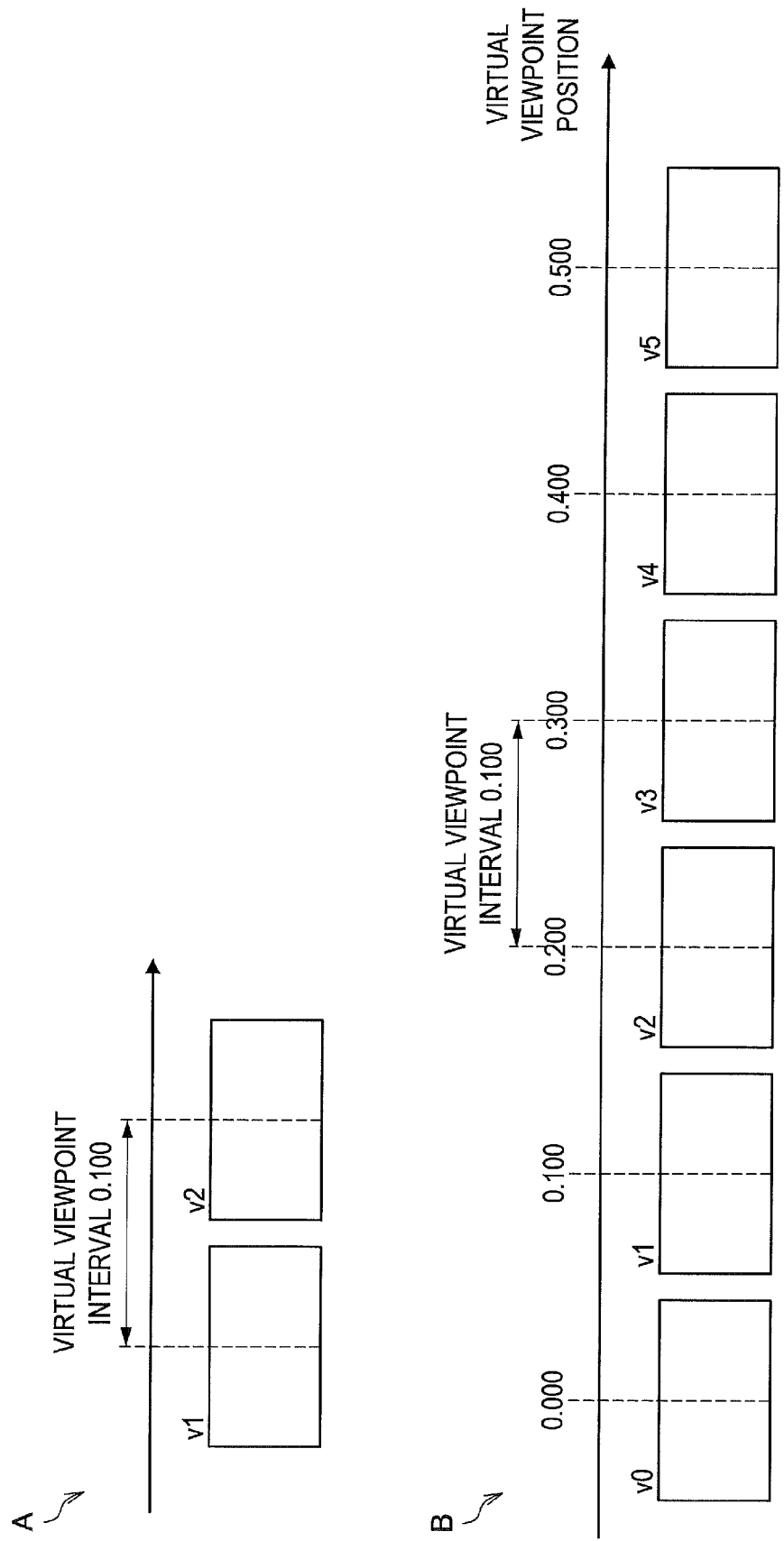
FIG. 7 is an explanatory diagram for describing an example of a virtual viewpoint position determination process according to a present embodiment.

FIG. 7 is an explanatory diagram for describing an example of the virtual viewpoint positions determination process according to the present embodiment. A shown in FIG. 7 shows an example of virtual viewpoint positions in the case where a stereoscopic image with a plurality of viewpoints of 2 viewpoints is displayed on the display screen. Further, B shown in FIG. 7 shows an example of virtual viewpoint positions in the case where a stereoscopic image with a plurality of viewpoints of 6 viewpoints is displayed on the display screen. Further, FIG. 7 shows an example of virtual viewpoint positions in the case where virtual viewpoint intervals corresponding to the image to be processed, which are determined in the virtual viewpoint interval determination section 102, are "0.100".

For example, the virtual viewpoint position determination section 104 determines virtual viewpoint positions in accordance with a display device for displaying images on a display screen, based on the virtual viewpoint intervals corresponding to the image to be processed, which are determined in the virtual viewpoint interval determination section 102. For example, in the case where the display device is a glasses type display device, the virtual viewpoint position determination section 104 determines virtual viewpoint positions, such as shown in A of FIG. 7, by setting intervals of adjacent viewpoint positions (hereinafter, represented as "adjacent viewpoint intervals") as the virtual viewpoint intervals corresponding to the image to be processed, which are determined in the virtual viewpoint interval determination section 102. Further, for example, in the case where the display device is a display device capable of forming images corresponding to each of the left eye and right eye of a user, by collating each viewpoint image at a constant set viewing distance from the display screen, such as a naked eye 3D display using a lens or barrier, the virtual viewpoint position determination section 104 determines virtual viewpoint positions, such as shown in B of FIG. 7, by setting adjacent viewing intervals as the virtual viewpoint intervals corresponding to the image to be processed, which are determined in the virtual viewpoint interval determination section 102.

Note that, the virtual viewpoint position determination process in the virtual viewpoint position determination section 104 is not limited to determining virtual viewpoint positions by setting adjacent viewpoint intervals as equal intervals, such as shown in FIG. 7, for example.

For example, the virtual viewpoint position determination section 104 may adjust the interval between each viewpoint, based on the virtual viewpoint intervals corresponding to the image to be processed, which are determined in the virtual viewpoint interval determination section 102, and may determine virtual viewpoint positions in accordance with the adjusted intervals of the viewpoints (adjusted virtual viewpoint intervals).

Here, for example, an adjustment which sets virtual viewpoint positions of the image corresponding to the end viewpoint position to be the same as a viewpoint position of the image corresponding to a center viewpoint position can be included as an adjustment of the intervals between each viewpoint in the virtual viewpoint position determination section 104. For example, by performing an adjustment such as described above, the possibility of a reverse view occurring can be reduced. Note that, it is needless to say that the example of the interval between each viewpoint capable of being adjusted in the virtual viewpoint position determination section 104 is not limited to that described above.

(3) The Virtual Viewpoint Image Generation Section 106

The virtual viewpoint image generation section 106 serves the purpose of proactively performing the virtual viewpoint image generation process according to the present embodiment. The virtual viewpoint image generation section 106 selectively generates virtual viewpoint images corresponding to the virtual viewpoint positions, which are determined in the virtual viewpoint position determination section 104, based on the image to be processed.

Here, for example, in the case where the number of viewpoint positions determined in the virtual viewpoint position determination section 104 and the number of images which constitute the image to be processed are equal to each other, and the virtual viewpoint intervals determined in the virtual viewpoint interval determination section 102 and the viewpoint intervals in the image to be processed are equal to each other, the virtual viewpoint image generation section 106 does not generate virtual viewpoint images. Further, for example, in cases other than the case where the above described virtual viewpoint images are not generated, such as a case where the number of viewpoint positions determined in the virtual viewpoint position determination section 104 is larger than the number of images which constitute the image to be processed, the virtual viewpoint image generation section 106 generates virtual viewpoint images.

Further, for example, the virtual viewpoint image generation section 106 displays the image to be processed, and/or selectively generated virtual viewpoint images, on the display screen. Here, for example, a display screen of the display section (not shown in the figures), or a display screen of a display device included in an external display device, can be included as the display screen on which selectively generated virtual viewpoint images or the like are displayed.

For example, the virtual viewpoint image generation section 106 performs mapping, and displays images on the display screen, by transmitting signals which include image data showing the displayed images, and control instructions controlling the display, to the display device. Note that, for example, the process according to the display on the display screen of the image to be processed and selectively generated virtual viewpoint images may be performed by a constituent element (for example, the control section (not shown in the figures) or the like included in the image processing apparatus 100.

Further, for example, it is possible for the virtual viewpoint image generation section 106 to record the image to be processed and selectively generated virtual viewpoint images on a recording medium such as the storage section (not shown in the figures) or an external recording medium. Note that, for example, the process according to the recording on the recording medium of the image to be processed and selectively generated virtual viewpoint images may be performed by a constituent element (for example, the control section (not shown in the figures) or the like) included in the image processing apparatus 100.

For example, by including the virtual viewpoint interval determination section 102, the virtual viewpoint position determination section 104 and the virtual viewpoint image generation section 106, the image processing apparatus 100 performs the processes by the image processing method according to the present embodiment (for example, the virtual viewpoint interval determination process according to the present embodiment, the virtual viewpoint position determination process according to the present embodiment, and the virtual viewpoint image generation process according to the present embodiment).

Here, the image processing apparatus 100 determines virtual viewpoint intervals corresponding to the image to be processed, based on the parallax corresponding to the image to be processed and the image feature amount for each pixel in the image to be processed, in the virtual viewpoint interval determination section 102. That is, for example, the virtual viewpoint intervals corresponding to the image to be processed, which are determined in the image processing apparatus 100, may be automatically changed for each image to be processed, in accordance with information (parallax, image feature amount) related to the image to be processed.

Therefore, the image processing apparatus 100 can determine virtual viewpoint intervals corresponding to the image to be processed. Further, by setting virtual viewpoint intervals corresponding to the image to be processed, based on the parallax corresponding to the image to be processed and the image feature amount for each pixel in the image to be processed, the image processing apparatus 100 can prevent the occurrence of the above described problems which may occur in the case where the virtual viewpoint intervals are made constant.

Further, the image processing apparatus 100 determines virtual viewpoint positions, based on the virtual viewpoint intervals corresponding to the image to be processed, which are determined in the virtual viewpoint interval determination section 102, in the virtual viewpoint position determination section 104. Also, the image processing apparatus 100 selectively generates virtual viewpoint images corresponding to the virtual viewpoint positions determined in the virtual viewpoint position determination section 104, in the virtual viewpoint image generation section 106.

Therefore, for example, by displaying virtual viewpoint images selectively generated by the image processing apparatus 100 on the display screen, it becomes possible to present the user with a higher quality stereoscopic image by preventing the generation of the above described problems which may occur in the case where the virtual viewpoint intervals are made constant.

Note that, the configuration of the image processing apparatus according to the present embodiment is not limited to the configuration shown in FIG. 3.

For example, it is possible for the image processing apparatus according to the present embodiment to take a configuration which does not include the virtual viewpoint image generation section 106, or a configuration which does not include the virtual viewpoint position determination section 104 and the virtual viewpoint image generation section 106. The image processing apparatus according to the present embodiment can perform the virtual viewpoint interval determination process according to the present embodiment, even in the case where each of the above described configurations are taken. Therefore, the image processing apparatus according to the present embodiment can determine virtual viewpoint intervals corresponding to the image to be processed, or can prevent the generation of the above described problems which may occur in the case where the virtual viewpoint intervals are made constant, even in the case where each of the above described configurations are taken.

Further, for example, the image processing apparatus according to the present embodiment may additionally include the display section (not shown in the figures) which displays images on the display screen, such as described above. In the case where the display section (not shown in the figures) is additionally included, for example, it is possible for the image processing apparatus according to the present embodiment to display the image to be processed, and/or selectively generated virtual viewpoint images, on the display screen of the display section (not shown in the figures).

Here, for example, in the case where the display device is a naked eye 3D display corresponding to naked eye 3D, a double image/lack of focus due to viewing a reverse view or crosstalk may occur. Further, for example, while viewing a reverse view is not generated in principle, in the case where the display device is a glasses type display device corresponding to glasses type 3D, a double image/lack of focus due to crosstalk may occur. Further, for example, in both the case where the display device is a naked eye 3D display corresponding to naked eye 3D, and the case where the display device is a glasses type display device corresponding to glasses type 3D, there is the possibility that a feeling of fatigue of the user who views a stereoscopic image will increase, by having the parallax of this stereo image too large, at the time when the image to be processed is a stereo image presented by broadcast waves, or a stereo image provided by a recording medium. In addition, in the case of both of the above described display devices, for example, a double image or lack of focus may be perceived by the user, and a decrease in image quality may occur, at the time when the performance of the display device is low and there is a lot of crosstalk.

As described above, the image processing apparatus according to the present embodiment determines virtual viewpoint intervals corresponding to the image to be processed, by the virtual viewpoint interval determination process according to the present embodiment. Further, for example, virtual viewpoint images according to the present embodiment, which are generated by the virtual viewpoint image generation process according to the present embodiment, are images regenerated based on the image to be processed, in accordance with viewpoint intervals based on the virtual viewpoint intervals determined by the image processing apparatus according to the present embodiment.

Therefore, for example, by displaying the virtual viewpoint images according to the present embodiment, which are generated by the virtual viewpoint image generation process according to the present embodiment, on the display screen, such as described above, a reverse view or a double image and lack of focus due to crosstalk and the occurrence of a decrease in image quality can be prevented, and a stereoscopic image capable of being viewed more comfortably by the user with a higher quality can be displayed on the display screen.

As described above, for example, the image processing apparatus according to the present embodiment determines virtual viewpoint intervals corresponding to the image to be processed, based on the parallax corresponding to the image to be processed and the image feature amount for each pixel in the image to be processed, as a process by the image processing method according to the present embodiment. That is, for example, the virtual viewpoint intervals corresponding to the image to be processed, which are determined by the image processing apparatus according to the present embodiment, may be automatically changed for each image to be processed, in accordance with information (parallax, image feature amount) related to the image to be processed.

Therefore, the image processing apparatus according to the present embodiment can determine virtual viewpoint intervals corresponding to the image to be processed in accordance with the image to be processed, per frame or the like, for example.

Further, for example, by determining virtual viewpoint intervals corresponding to the image to be processed in accordance with the image to be processed, it becomes possible to present images with a more appropriate stereoscopic effect, images in which a double image or lack of focus is small, or images in which the motion parallax is smooth. Therefore, by performing the processes by the image processing method according to the present embodiment, the image processing apparatus according to the present embodiment can realize a high quality of a stereoscopic image.

Further, for example, by determining virtual viewpoint intervals corresponding to the image to be processed in accordance with the image to be processed, it becomes possible to more appropriately control a stereoscopic effect. Therefore, by performing the processes by the image processing method according to the present embodiment, it becomes possible for the image processing apparatus according to the present embodiment to provide images in which a feeling of fatigue of the user is low.

Further, for example, by using information related to the display device, the image processing apparatus according to the present embodiment can determine virtual viewpoint intervals corresponding to the display device.

Further, for example, the image processing apparatus according to the present embodiment can determine virtual viewpoint intervals in accordance with an estimated viewing position of the user.

Further, since it is possible for the image processing apparatus according to the present embodiment to determine virtual viewpoint intervals corresponding to an estimated viewing position of the user, for example, in the case where the display device which displays a stereoscopic image on the display screen is a naked eye 3D display, it becomes possible for the image processing apparatus according to the present embodiment to more appropriately control parallax at the time when the user views an image other than from a set distance. Therefore, in the above described case, an image in which discomfort due to viewing reverse view is low can be provided, or the viewing range capable of obtaining a comfortable stereoscopic image can be enlarged.

Further, for example, in the case where the display device which displays a stereoscopic image on the display screen is a naked eye 3D display, and the stereoscopic image is viewed by a plurality of users, it is possible for the image processing apparatus according to the present embodiment to determine virtual viewpoint intervals, by considering the viewing position of each of the users. Therefore, by performing the processes according to the image processing method according to the present embodiment, it becomes possible for the image processing apparatus according to the present embodiment to provide a more appropriate stereoscopic image, in the above described case.

Heretofore, while a description has been made by including an image processing apparatus as the present embodiment, the present embodiment is not limited to such an embodiment. For example, the present embodiment can be applied to various electronic apparatuses capable of processing an image, such as a tablet type apparatus, a communication apparatus such as a mobile phone or a smart phone, a video/music playback device (or a video/music recording/playback device), a game machine, a computer such as a PC (Personal Computer), an imaging apparatus such as a digital camera or a digital video camera, or a display device such as a television receiving apparatus. Further, for example, the present embodiment can be applied to a processing IC (Integrated Circuit), which is capable of being embedded in an electronic apparatus such as those described above.

Further, for example, the processes according to the image processing method according to the present embodiment may be implemented by a system including a plurality of apparatuses, in which a connection to a network (or communication between each of the apparatuses), is provided, such as cloud computing.

(Program According to the Present Embodiment)

A program for causing a computer to function as the image processing apparatus according to the present embodiment (for example, a program capable of executing the processes according to the image processing method according to the present embodiment, such as "the virtual viewpoint interval determination process according to the present embodiment", "the virtual viewpoint interval determination process according to the present embodiment, and the virtual viewpoint position determination process according to the present embodiment", or "the virtual viewpoint interval determination process according to the present embodiment, the virtual viewpoint position determination process according to the present embodiment, and the virtual viewpoint image generation process according to the present embodiment") can determine virtual viewpoint intervals corresponding to the image to be processed, by being executed in the computer.

Further, by executing, in a computer, a program for causing the computer to function as the image processing apparatus according to the present embodiment, an effect can be accomplished which is capable of being accomplished by using the image processing method according to the above described present embodiment.

It should be understood by those skilled in the art that various modifications, combinations, sub-combinations and alterations may occur depending on design requirements and other factors insofar as they are within the scope of the appended claims or the equivalents thereof.

For example, while providing a program (computer program) for causing a computer to function as the image processing apparatus according to the present embodiment has been described above, the present embodiment can additionally provide the program in conjunction with a recording medium which is allowed to store the above described program.

The above described configuration shows an example of the present embodiment, and naturally belongs to the technical scope of the present disclosure.

Additionally, the present technology may also be configured as below.

(1) An image processing apparatus, including:
  a virtual viewpoint interval determination section which determines virtual viewpoint intervals corresponding to an image to be processed based on a parallax corresponding to the image to be processed and an image feature amount for each pixel in the image to be processed.

(2) The image processing apparatus according to (1),
  wherein the virtual viewpoint interval determination section includes
    a first virtual viewpoint interval determination section which determines a virtual viewpoint interval for each prescribed pixel unit based on the parallax corresponding to the image to be processed, the image feature amount for each pixel, and a display quality value which quantitatively shows a quality in a case where displayed, and
    a second virtual viewpoint interval determination section which calculates a histogram of the virtual viewpoint intervals determined for each prescribed pixel unit, and determines the virtual viewpoint intervals corresponding to the image to be processed based on the calculated histogram and a set accumulated value.

(3) The image processing apparatus according to (2),
  wherein the first virtual viewpoint interval determination section determines the virtual viewpoint interval for each prescribed pixel unit by using an evaluation function in which the display quality value is represented by a relation between the parallax corresponding to the image to be processed and the image feature amount.

(4) The image processing apparatus according to (3),
  wherein the evaluation function is set for each viewing position which are positions at which a user views an image displayed on a display screen, and
  wherein the first virtual viewpoint interval determination section uses the evaluation function in accordance with an estimated viewing position of the user.

(5) The image processing apparatus according to (3) or (4), wherein the evaluation function is set for each type of information related to a display device for displaying images on a display screen, and wherein the first virtual viewpoint interval determination section uses the evaluation function in accordance with the information related to the display device corresponding to a display device for displaying images.

(6) The image processing apparatus according to (2), wherein the first virtual viewpoint interval determination section determines the virtual viewpoint interval for each prescribed pixel unit by using association information in which the parallax corresponding to the image to be processed, the image feature amount, the display quality value and the virtual viewpoint interval are associated with each other.

(7) The image processing apparatus according to (6), wherein the association information is set for each viewing position which are positions at which a user views an image displayed on a display screen, and wherein the first virtual viewpoint interval determination section uses the association information in accordance with an estimated viewing position of the user.

(8) The image processing apparatus according to (6) or (7), wherein the association information is set for each type of information related to a display device for displaying images on a display screen, and wherein the first virtual viewpoint interval determination section uses the association information in accordance with the information related to the display device corresponding to a display device for displaying images.

(9) The image processing apparatus according to any one of (2) to (8), wherein the second virtual viewpoint interval determination section sets a weighting for virtual viewpoint intervals of determined pixels, and calculates a histogram of the weighted virtual viewpoint intervals.

(10) The image processing apparatus according to any one of (2) to (9), wherein the virtual viewpoint interval determination section further includes a limiting parallax setting section which sets an upper limit value of the virtual viewpoint intervals corresponding to the image to be processed, and wherein the second virtual viewpoint interval determination section does not determine values larger than the set upper limit value as the virtual viewpoint intervals corresponding to the image to be processed.

(11) The image processing apparatus according to any one of (1) to (10), further including:

a virtual viewpoint position determination section which determines virtual viewpoint positions corresponding to the image to be processed based on the determined virtual viewpoint intervals corresponding to the image to be processed.

(12) The image processing apparatus according to (11), further including:

a virtual viewpoint image generation section which selectively generates virtual viewpoint images which are images corresponding to the determined virtual viewpoint positions based on the image to be processed.

(13) The image processing apparatus according to any one of (1) to (12), further including:

a display section for displaying images on a display screen.

(14) An image processing method, including:

determining virtual viewpoint intervals corresponding to an image to be processed based on a parallax corresponding to the image to be processed and an image feature amount for each pixel in the image to be processed.

What is claimed is:

1. An image processing apparatus, comprising virtual viewpoint interval determination sections which determines virtual viewpoint intervals corresponding to an image to be processed based on a parallax corresponding to the image to be processed and an image feature amount for each pixel in the image to be processed, wherein, the virtual viewpoint interval determination sections includes:

a first virtual viewpoint interval determination section which determines a virtual viewpoint interval for each prescribed pixel unit based on the parallax corresponding to the image to be processed, the image feature amount for each pixel, and a display quality value which quantitatively shows a quality in a case where displayed, and a second virtual viewpoint interval determination section which calculates a histogram of the virtual viewpoint intervals determined for each prescribed pixel unit, and determines the virtual viewpoint intervals corresponding to the image to be processed based on the calculated histogram and a set accumulated value.

2. The image processing apparatus according to claim 1, wherein the first virtual viewpoint interval determination section determines the virtual viewpoint interval for each prescribed pixel unit by using an evaluation function in which the display quality value is represented by a relation between the parallax corresponding to the image to be processed and the image feature amount.

3. The image processing apparatus according to claim 2, wherein:

the evaluation function is set for each viewing position which are positions at which a user views an image displayed on a display screen, and the first virtual viewpoint interval determination section uses the evaluation function in accordance with an estimated viewing position of the user.

4. The image processing apparatus according to claim 2, wherein:

the evaluation function is set for each type of information related to a display device for displaying images on a display screen, and the first virtual viewpoint interval determination section uses the evaluation function in accordance with the information related to the display device corresponding to a display device for displaying images.

5. The image processing apparatus according to claim 1, wherein the first virtual viewpoint interval determination section determines the virtual viewpoint interval for each prescribed pixel unit by using association information in which the parallax corresponding to the image to be processed, the image feature amount, the display quality value and the virtual viewpoint interval are associated with each other.

6. The image processing apparatus according to claim 5, wherein:

the association information is set for each viewing position which are positions at which a user views an image displayed on a display screen, and the first virtual viewpoint interval determination section uses the association information in accordance with an estimated viewing position of the user.

7. The image processing apparatus according to claim 5, wherein:

the association information is set for each type of information related to a display device for displaying images on a display screen, and the first virtual viewpoint interval determination section uses the association information in accordance with the information related to the display device corresponding to a display device for displaying images.

8. The image processing apparatus according to claim 1, wherein the second virtual viewpoint interval determination section sets a weighting for virtual viewpoint intervals of determined pixels, and calculates a histogram of the weighted virtual viewpoint intervals.

9. The image processing apparatus according to claim 1, wherein:

the virtual viewpoint interval determination section further includes a limiting parallax setting section which sets an upper limit value of the virtual viewpoint intervals corresponding to the image to be processed, and the second virtual viewpoint interval determination section does not determine values larger than the set upper limit value as the virtual viewpoint intervals corresponding to the image to be processed.

10. The image processing apparatus according to claim 1, further comprising a virtual viewpoint position determination section which determines virtual viewpoint positions corresponding to the image to be processed based on the determined virtual viewpoint intervals corresponding to the image to be processed.

11. The image processing apparatus according to claim 10, further comprising a virtual viewpoint image generation section which selectively generates virtual viewpoint images which are images corresponding to the determined virtual viewpoint positions based on the image to be processed.

12. The image processing apparatus according to claim 1, further comprising a display section for displaying images on a display screen.

13. An image processing method, comprising:

using virtual viewpoint interval determination sections to determine virtual viewpoint intervals corresponding to an image to be processed based on a parallax corresponding to the image to be processed and an image feature amount for each pixel in the image to be processed;

using a first virtual viewpoint interval determination section to determine a virtual viewpoint interval for each prescribed pixel unit based on the parallax corresponding to the image to be processed, the image feature amount for each pixel, and a display quality value which quantitatively shows a quality in a case where displayed; and using a second virtual viewpoint interval determination section to calculate a histogram of the virtual viewpoint intervals determined for each prescribed pixel unit and determine the virtual viewpoint intervals corresponding to the image to be processed based on the calculated histogram and a set accumulated value.

* * * * *